United States Patent [19]

Oliwa

[11] Patent Number: 5,237,321
[45] Date of Patent: Aug. 17, 1993

[54] METHOD AND APPARATUS FOR AUTOMATICALLY TRANSMITTING A PAGING MESSAGE IN AN ALTERNATE PAGING SYSTEM

[75] Inventor: Gary A. Oliwa, Boynton Beach, Fla.

[73] Assignee: Motorola, Inc., Schaumburg, Ill.

[21] Appl. No.: 628,932

[22] Filed: Dec. 13, 1990

Related U.S. Application Data

[63] Continuation of Ser. No. 383,684, Jul. 24, 1989, abandoned.

[51] Int. Cl.⁵ .............................................. H04B 7/00
[52] U.S. Cl. .............................. 340/825.44; 455/32.1; 379/59
[58] Field of Search ............... 340/825.44, 825.49, 340/311.1; 455/32, , 33, 32.1, 33.1, 33.3; 379/59, 60

[56] References Cited

U.S. PATENT DOCUMENTS

| | | | |
|---|---|---|---|
| 4,178,476 | 12/1979 | Frost | 340/825.44 |
| 4,518,961 | 5/1985 | Davis et al. | 340/825.44 |
| 4,644,351 | 2/1987 | Zabarsky et al. | 340/825.44 |
| 4,649,538 | 3/1987 | Deluca et al. | 371/24 |
| 4,661,972 | 4/1987 | Kai | 340/825.44 |
| 4,700,374 | 10/1987 | Bini | 379/60 |
| 4,755,816 | 7/1988 | Deluca | 340/825.44 |
| 4,814,763 | 3/1989 | Nelson et al. | 340/825.44 |
| 4,843,622 | 6/1989 | Yotsutani et al. | 379/59 |
| 4,876,738 | 10/1989 | Selby | 379/60 |

*Primary Examiner*—Donald J. Yusko
*Assistant Examiner*—Dervis Magistre
*Attorney, Agent, or Firm*—Daniel R. Collapy; William E. Koch; Thomas G. Berry

[57] ABSTRACT

When a first paging network system terminal determines that a pager is not within the coverage area of that network system, a paging message is automatically transmitted from another paging network system terminal. The pager wearer can advise the first paging network system terminal of his travel to another paging network system coverage area or the first paging network system terminal forwards the paging message to a predesignated alternate paging network system terminal.

14 Claims, 5 Drawing Sheets

METHOD AND APPARATUS FOR AUTOMATICALLY TRANSMITTING A PAGING MESSAGE IN AN ALTERNATE PAGING SYSTEM

This is a continuation of application Ser. No. 07/383,684, filed Jul. 24, 1989, now abandoned.

FIELD OF THE INVENTION

This invention relates in general to selective call receiver network systems, and more particularly to a selective call receiver network system capable of automatically switching transmission of a message to a second selective call receiver network system upon determining that the selective call receiver is not within the coverage area of the first network system.

BACKGROUND OF THE INVENTION

Selective call receivers, including pagers, are widely used to disseminate business and other information. Alphanumeric, voice or tone-only messages can be delivered by radio transmission from a network system. Some network systems have a localized coverage area, some even solely within one building such as a hospital. These network systems are called on-site paging network systems. Other network systems, called wide area network systems, allow for transmission of messages over a large area. In this manner, a selective call receiver can receive messages anywhere within an urban area, or even statewide. Nationwide and international paging schemes are being developed to allow for messages to be forwarded from an originating network system to a network system wherein the transmission can be received by the pager wearer.

In on-site paging systems such as those used in hospitals, it is necessary for the pager wearer to manually inform the network system when he is no longer within the coverage area. Once informed, the system can route incoming pages to the surrounding wide area system, or to whatever alternate system is designated. If the pager wearer is a doctor and receives an emergency call to proceed to a location outside the hospital within the coverage area of the wide area system, he must take the time to call up the paging network system and advise it of his departure from the coverage area. The system would then route his pages to the wide area network system for transmission. If the doctor is detained within the hospital after the network system begins transmitting his pages on the wide area system, he may not receive those pages. Also, if the doctor is in such a hurry as to forget or not be able to take the time to call the on-site network system, the doctor will not receive any of his pages during his time outside the on-site system's coverage area.

Nationwide paging schemes, such as that discussed in U.S. Pat. No. 4,178,476, allow for a message to be passed from one network system to another after the pager wearer has informed the network system of his intent to depart the coverage area and, upon his arrival at his destination, after the pager wearer has again called the network system to inform it of his arrival at his destination. The drawback of this scheme is that it requires two actions on the part of the pager wearer to avoid lost messages.

Thus, what is needed is a scheme for automatically transferring transmission from one paging network system to another upon the first network system determining that the pager wearer is no longer within its coverage area.

SUMMARY OF THE INVENTION

In accordance with a first aspect of the present invention, there is provided a method for transmitting a message to a selective call receiver. The method comprises the steps of receiving first selective call information from a message originator, transmitting a first message intended for the selective call receiver and comprising said first selective call information over a first selective call network system, informing the message originator that the first message was received in response to the selective call receiver acknowledging reception of the message. The method also comprises the steps of informing the message originator that the first message was not received in response to the selective call receiver not acknowledging reception of the message, receiving second selective call information from the message originator in response to informing him that the first message was not received, forwarding a second message comprising the second selective call information from the first selective call network system to a second selective call network system for transmission therefrom, and informing the message originator that the second message was forwarded to the second selective call network system for transmission therefrom.

In accordance with a second aspect of the present invention, there is provided a first selective call network system for transmitting a message to a selective call receiver. The first selective call network system comprises a first means for transmitting an interrogation signal, a second means for determining whether the selective call receiver receives the interrogation signal transmitted from the first network system, and a third means responsive to the second means for transmitting the message to the selective call receiver from the first network system if the second means determines that the selective call receiver received the interrogation signal. Additionally, the third means alters the message to derive an altered message and forwards the altered message to a second selective call network system for transmittal therefrom if the second means determines that the selective call receiver did not receive the interrogation signal.

DETAILED DESCRIPTION OF THE INVENTION

Figure 1:
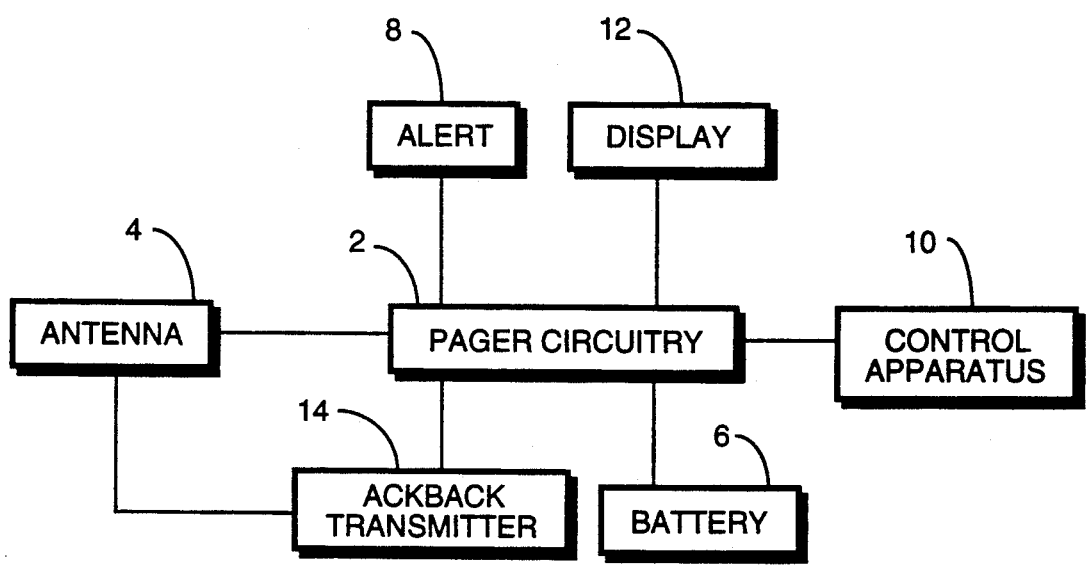
FIG. 1 is a block diagram of the selective call receiver according to the present invention.

Turning now to the various drawing figures, in which like numerals reference like parts, a detailed description of the preferred embodiment will be provided. Referring to FIG. 1, a block diagram of a selective call receiver according to the present invention comprises pager circuitry 2 coupled to each of antenna 4, battery 6, alert apparatus 8, and control apparatus 10. Control apparatus 10 could be any or all of controls such as on/off, volume control, and display control switches for performing the pager operations well known to those skilled in the art. A display apparatus 12 may be included in the pager for visually displaying an alert or a message. For a more detailed description of the structure and operation of a selective call radio paging receiver of the type shown in FIG. 1, reference is made to U.S. Pat. No. 4,518,961, issued May 21, 1985 and entitled "Universal Paging Device With Power Conservation"; U.S. Pat. No. 4,649,538, issued Mar. 10, 1987 and entitled "Radio Paging Device With Improved Test Modes"; and U.S. Pat. No. 4,755,816, issued Jul. 5, 1988 and entitled "Battery Saving Methods for Selective Radio Paging Receiver", all commonly assigned to the same assignee as the present invention, and the teachings of which are hereby incorporated by reference.

Additionally, acknowledge back (ACKBACK) transmitter 14 is coupled to pager circuitry 2 and antenna 4 for transmitting an acknowledgement signal in response to receipt of a paging message. In an alternate ACKBACK scheme particularly suitable to lengthy transmissions such as voice transmissions, an interrogation signal is transmitted from the network system to determine if the selective call receiver is within the network's coverage area. Transmitter 14 transmits an acknowledgement signal in response to receipt of the interrogation signal. The network system then transmits the paging message after receipt of an acknowledgement signal, thereby minimizing air time by not broadcasting lengthy messages to selective call receivers which cannot receive the messages.

Figure 2:
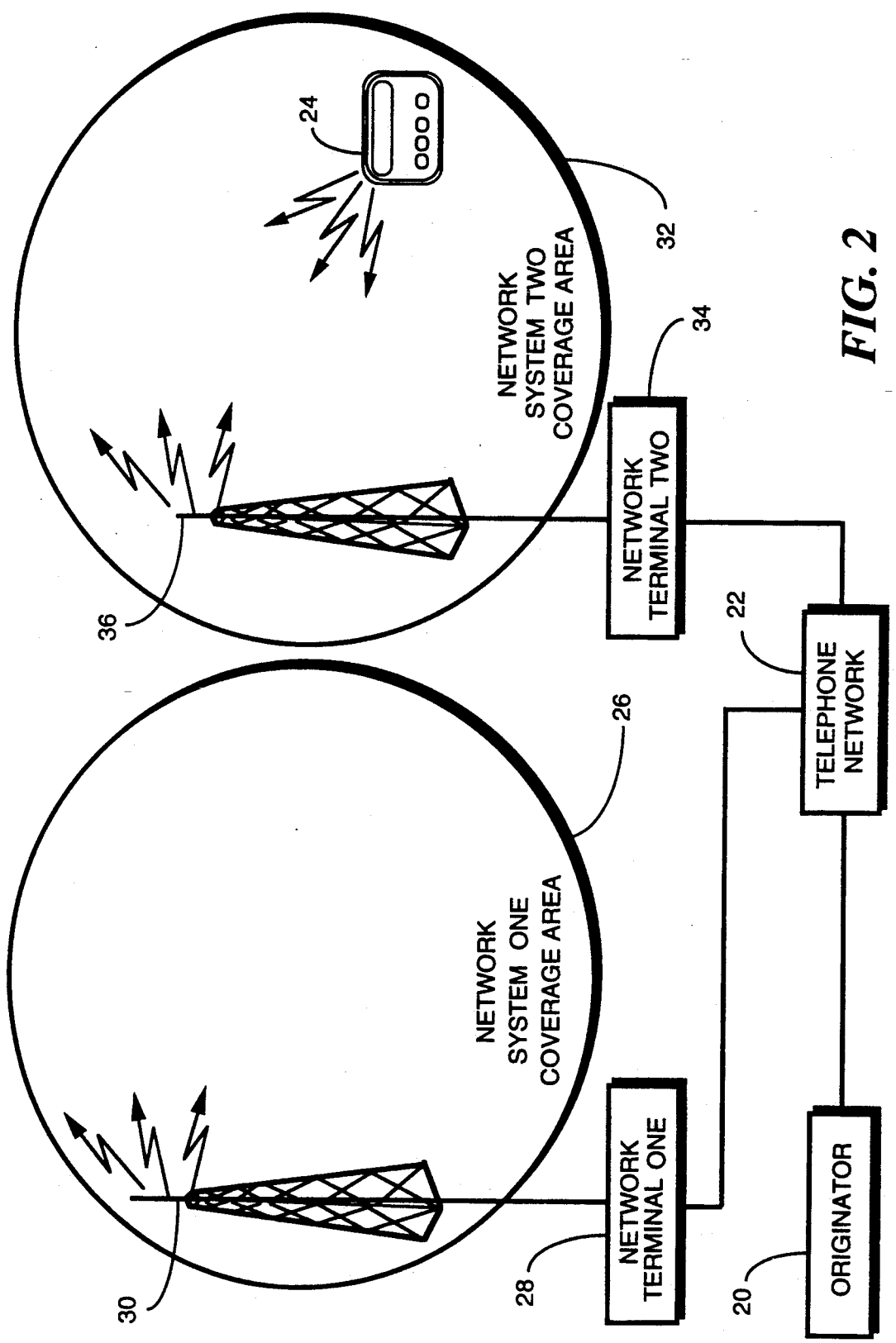
FIG. 2 is a diagram of the present invention.

Referring to FIG. 2 originator 20 of a paging message typically dials up the public switched telephone network 22 to send the paging message to a particular selective call receiver 24 believed to be within coverage area 26 of Paging Network System One, comprising paging network terminal 28 and transmitter 30. If Paging Network System One is an on-site paging network system, such as that used in a hospital, telephone network 22 could be a PBX localized intercom network. Originator 20 passes his message to terminal 28 and the message is transmitted via transmitter 30 throughout coverage area 26. If the message is alphanumeric data which could be transmitted in real time, terminal 28 transmits the message via transmitter 30 to determine if pager 24 is receiving within coverage area 26. If the message is voice data, terminal 28 transmits an interrogation signal via transmitter 30 in order to determine if selective call receiver 24 is receiving within coverage area 26.

Terminal 28 determines that selective call receiver is not receiving within coverage area 26 if it has not received an acknowledgement signal from pager 24 within a predetermined time after transmission. With no acknowledgement signal received, terminal 28 contacts Paging Network System Two, comprising paging network terminal 34 and transmitter 36, via telephone network 22. In a manner identical to that of Paging Network System One, terminal 34 determines whether pager 24 is within coverage area 32 of transmitter 36. Pager 24 is receiving within coverage area 32 and transmits an acknowledgement signal to terminal 34 that the message or the interrogation signal was received. If transmitter 36 had transmitted an interrogation signal, upon receipt of the acknowledgement signal, terminal 34 would transmit the paging message to pager 24 via transmitter 36. In an alternate embodiment, if Paging Network System Two is not equipped with acknowledge-back capability, terminal 34 would simply transmit the paging message via transmitter 36.

In order for a pager wearer to be able to receive messages in more than one network, he must either be equipped with a different pager for each of the network systems or wear a pager capable of scanning between the frequencies of the network systems.

In one embodiment of the present invention, Paging Network System One and Paging Network System Two are related networks such as an on-site paging system and the surrounding wide area paging network. In this particular embodiment, terminal 28 inherently knows to which alternate paging network to transfer. In a second embodiment of the present invention, particularly suitable to a nationwide or worldwide paging scheme, the wearer of pager 24 would inform Paging Network System One either before or after leaving coverage area 26 of which paging network system he would be able to receive. Notice could be given to the network system several days in advance of departure because, after receiving the information identifying Paging Network System Two, terminal 28 would attempt successful transmission of all paging messages from Paging Network System Two after determining that pager 24 is not within coverage area 26. If no acknowledgment signal is received by terminal 34, the paging messages are stored for later transmission. In the preferred embodiment, particularly suitable to a pager wearer who regularly travels between the coverage area of an on-site paging network system and the coverage area of a wide area paging network system, the stored paging messages would be rebroadcast periodically, for example every hour, until such time as their receipt has been acknowledged by the pager. In an application where the pager wearer travels from one wide area network system to a new wide area network system, the stored paging messages would be broadcast after the pager wearer has been located within the coverage area of the new network system either by acknowledgement of receipt of a subsequent message or by the pager wearer informing the wide area network system that he has arrived in the coverage area of the new network system.

Figure 3A:
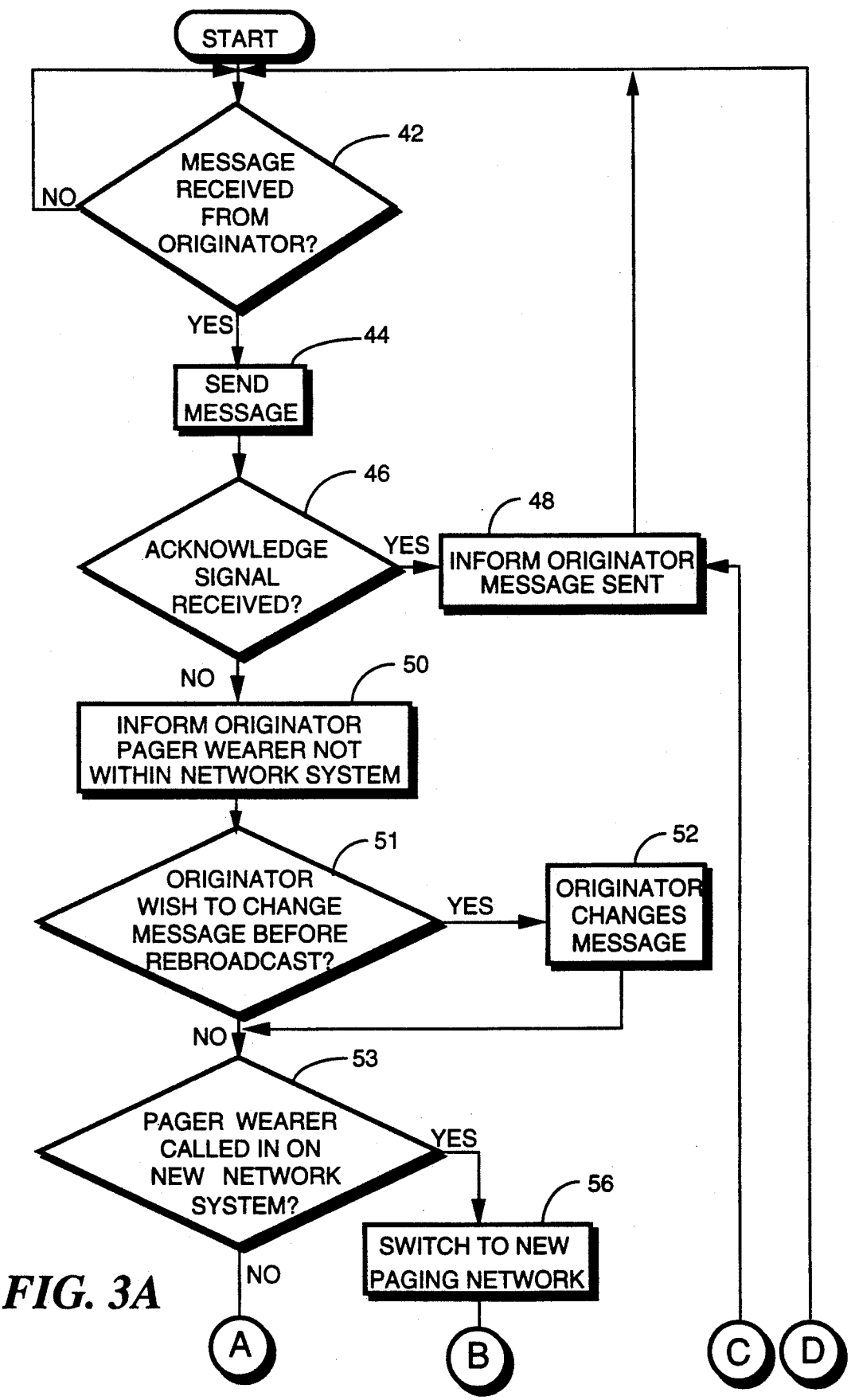
FIGS. 3A and 3B are flow charts of the operation of the preferred embodiment of the paging terminal according to the present invention.
Figure 3B:
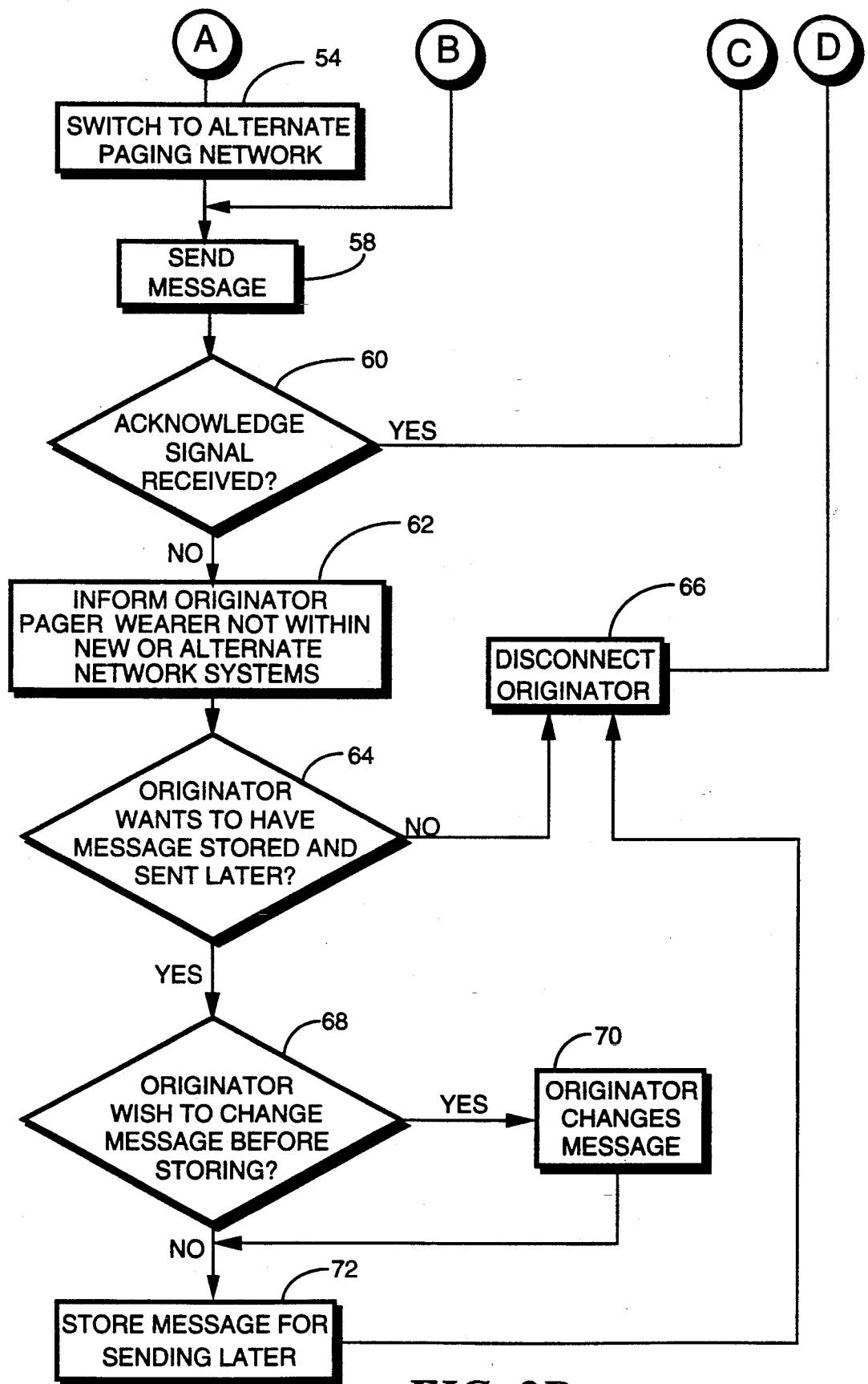

Referring to FIGS. 3A and 3B, a flowchart of the operation of terminal 28 (FIG. 2) in the preferred embodiment of the present invention is shown. In the preferred embodiment, the paging message consists of alphanumeric data which can be transmitted in a time period not substantially greater than the time period needed for transmission of an interrogation signal. When the system becomes operational, terminal 28 awaits receipt of a paging message from an originator 42. If no message has been received, the operation loops back to continue awaiting a paging message 42. Once a paging message has been received from an originator, the message is sent 44 and terminal 28 waits a predetermined period of time for receipt of an acknowledgement signal 46. In the preferred embodiment, the predetermined period of time would be less than one second.

If an acknowledgement signal is received 46, terminal 28 informs the originator that the message was sent and received 48 and returns to await another paging message 42. If no acknowledgement signal is received 46, terminal 28 informs the originator that the pager wearer is not within coverage area 26 (FIG. 2) of the network system 50. If the originator wishes to change the message before it is rebroadcast 51, the originator records a new message 52. If the pager wearer has advised the network system that he is changing paging networks 53, terminal 28 will access the paging terminal of the new network system 56. If the pager wearer has not advised the network system that he is changing paging networks 53, terminal 28 will access the paging terminal of an alternate network system 54. Terminal 28 in the preferred embodiment has the identity of an alternate network terminal 34 stored for each pager normally receiving paging messages from terminal 28.

After terminal 28 has accessed the new or alternate network system, the paging message is transmitted 58 within coverage area 32 (FIG. 2) of the new or alternate network system by new or alternate terminal 34. If an acknowledgement signal is received within the predetermined period of time 60, terminal 28, having received data from terminal 34 indicating that an acknowledgement signal was received, informs the originator that the message was sent and received 48, and returns to await another paging message 42. If no acknowledgement signal is received within the predetermined period of time 60, terminal 28, having received data from terminal 34 indicating that no acknowledgement signal was received, informs the originator that the pager wearer is not within the new or alternate network system's coverage area 62.

Next, terminal 28 inquires whether the originator wants to have the paging message stored for sending at a later time 64. If the originator does not want the message stored, terminal 28 disconnects the originator 66 and returns to await another paging message 42. If the originator wants the message stored, terminal 28 inquires whether the originator wishes to change the message before storing it 68. If the originator wishes to change the message, he does so 70. Then, terminal 28 stores the message 72 to later transmit the paging message after passage of a predetermined period of time. Terminal 28 then disconnects the originator 66 and returns to await another paging message 42.

Terminal 28 would send the paging message after waiting a sufficiently long predetermined period of time. If no acknowledgement signal is received, terminal 28 would continue to send the paging message after passage of the predetermined period of time until an acknowledgement signal is received. It would be obvious to one skilled in the art that stored messages could alternately be retrieved by the pager wearer contacting terminal 28.

As will also be obvious to one skilled in the art, steps 48, 50, and 62 are optional user friendly steps included in the preferred embodiment of the present invention. Most paging schemes include verification to the originator that the paging message has been sent. While the originator is on the phone line awaiting verification, the preferred embodiment decreases the dead time by advising the originator of the paging message transmission status. The preferred embodiment also allows originator interaction to permit the originator to choose between several optional actions to take.

Figure 4:
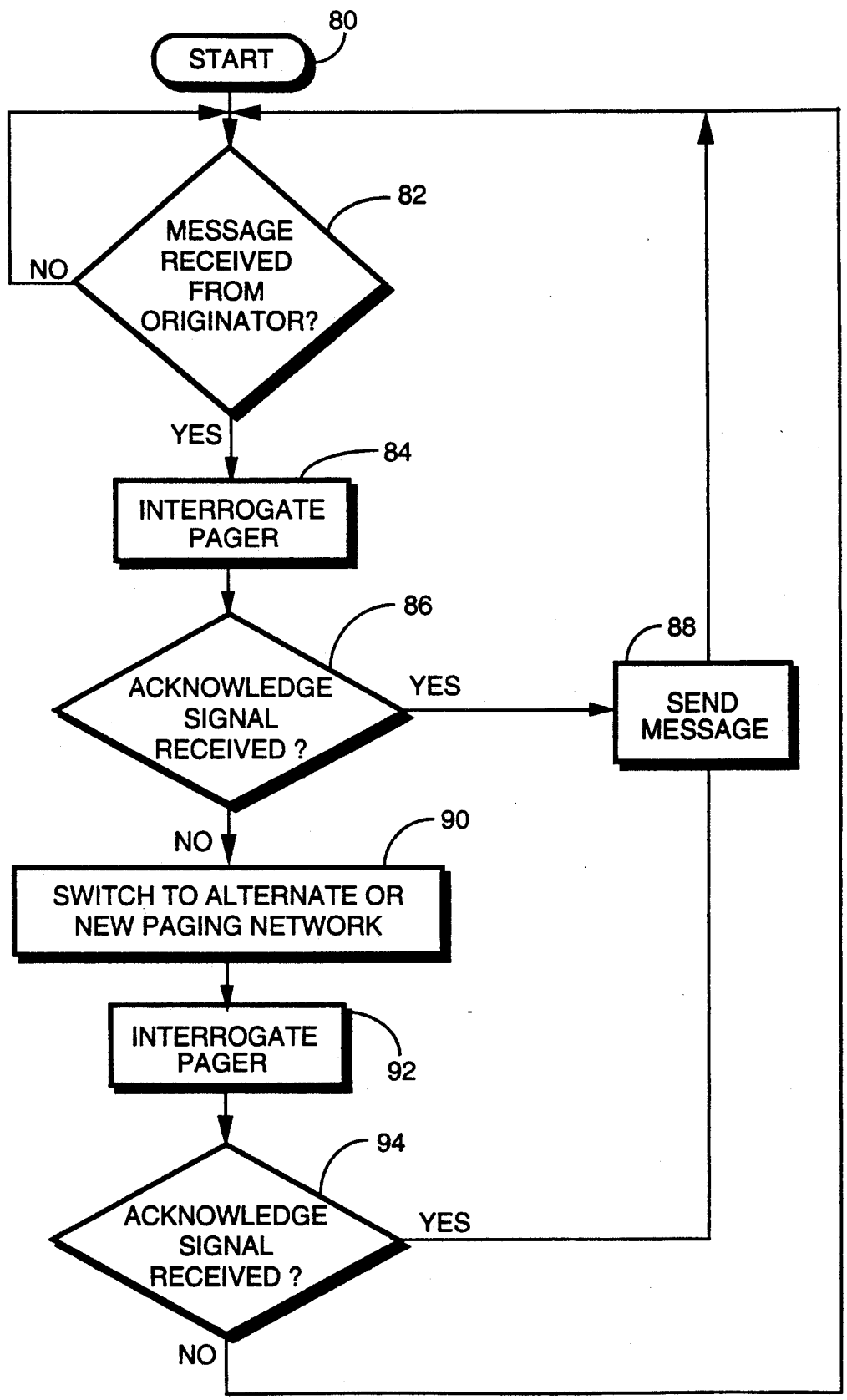
FIG. 4 is a flow chart of the operation of an alternate embodiment of a paging terminal according to the present invention.

Referring to FIG. 4, a flow chart of an alternate embodiment of the operation of terminal 28 is shown. In this alternate embodiment, the paging message consists of data which may only be transmitted in a time period substantially greater than the time period needed for transmission of an interrogation signal, such as voice data. When the system becomes operational, terminal 28 determines if a paging message has been received from an originator 82. If no message has been received, the operation loops back to continue awaiting receipt of a paging message 82.

Once a paging message has been received from an originator, an interrogation signal is sent 84 to determine if the pager wearer is within coverage area 26 (FIG. 2) and terminal 28 waits a predetermined period of time for receipt of an acknowledgement signal 86. If an acknowledgement signal is received, terminal 28 transmits the message to the pager 88 and returns to await another paging message 82.

If no acknowledgement signal is received, terminal 28 accesses the designated alternate paging network system or a new network system identified previously by the pager wearer 90, and the interrogation signal is transmitted 92 by terminal 34 (FIG. 2) to coverage area 32 of the new or alternate network system. If an acknowledgement signal is received within the predetermined period of time 94, terminal 28, having received data from terminal 34 indicating that an acknowledgement signal was received, forwards the message to terminal 34 which transmits the message 88 and terminal 28 returns to await another paging message 82. If no acknowledgement signal is received within the predetermined period of time 94, terminal 28 could either store the message to transmit again after waiting a predetermined interval of time and return to await a new message 82 or return to await a new message 82 without storing the message, whichever methodology is preprogrammed within terminal 28.

As will be obvious to one skilled in the art, the operation of the alternate embodiment could include any of the optional user friendly steps included in the preferred embodiment of the present invention.

By now it should be appreciated that there has been provided a method and apparatus for automatically transferring transmission from one paging network system to another upon the first network system determining that the pager wearer is no longer within the coverage area of the first network system.

I claim:

1. A method for transmitting a message to a selective call receiver comprising the steps of:

receiving first selective call information from a message originator;

transmitting a first message comprising said first selective call information and intended for the selective call receiver over a first selective call network system;

informing said message originator that said first message was received in response to the selective call receiver acknowledging reception of the message;

informing said message originator that said first message was not received in response to the selective call receiver not acknowledging reception of the message;

receiving second selective call information from said message originator in response to informing said message originator that said first message was not received;

forwarding a second message comprising said second selective call information from said first selective call network system to a second selective call network system for transmission therefrom; and informing said message originator that said second message was forwarded to the second selective call network system for transmission therefrom.

2. A method for sending a message to a selective call receiver comprising the steps of:

receiving first selective call information from a message originator;

transmitting a first interrogation signal from a first network system in response to said first selective call information;

transmitting a first message comprising said first selective call information from said first network system if an acknowledgement signal is received from said selective call receiver within a first predetermined period of time after transmission of said first interrogation signal;

requesting and receiving second selective call information from said message originator if said acknowledgement signal is not received from said selective call receiver within said first predetermined period of time after transmission of said first interrogation signal; and forwarding a second message comprising said second selective call information to a second network system for transmission therefrom in response to receiving said second selective call information.

3. The method of claim 2 further comprising the step of storing said second message for later transmission by said first network system in response to receiving said second selective call information.

4. A first selective call network system comprising:

means for receiving selective call information from a message originator;

means coupled to said receiving means for transmitting a first message comprising said selective call information;

means for determining whether a selective call receiver has received the first message;

means coupled to said determining means for informing the message originator that the first message was received by the selective call receiver if the determining means determines that the first message was received;

means coupled to said determining means for prompting the message originator to enter additional selective call information to form a second message if the determining means determines that the first message was not received; and means coupled to the receiving means and the prompting means for forwarding said second message to a second selective call network system for transmission therefrom if said selective call receiver does not receive said first message.

5. The apparatus of claim 4 wherein said first network system is an on site paging system and said second network system is a wide area network system.

6. The apparatus of claim 4 wherein said selective call receiver comprises means for generating an acknowledgment signal for indicating reception of said message from said first selective call network system or said second selective call network system, and wherein said prompting means and said forwarding means are responsive to nonreceipt of said acknowledgment signal within a predetermined period of time after transmission of said first message by said first selective call network system.

7. A first selective call network system for transmitting a message to a selective call receiver comprising:

first means for transmitting an interrogation signal;

second means for determining whether said selective call receiver receives said interrogation signal transmitted from said first network system; and third means responsive to said second means for transmitting said message to said selective call receiver from said first network system if said second means determines that said selective call receiver received said interrogation signal and for altering said message to derive an altered message and forwarding said altered message to a second selective call network system for transmittal therefrom if said second means determines that said selective call receiver did not receive said interrogation signal.

8. The selective call network system of claim 7 wherein said selective call receiver includes transmission means for transmitting an acknowledgement signal in response to receiving said interrogation signal, and wherein said second means comprises:

fourth means for receiving said acknowledgement signal from said selective call receiver, wherein said second means determines that said selective call receiver receives said interrogation signal if said fourth means receives said acknowledgement signal within a predetermined period of time.

9. The apparatus of claim 7 wherein said first network system is an on site paging system and said second network system is a wide area network system.

10. The method of claim 2 wherein said forwarding step comprises the steps of:

transmitting a second interrogation signal from said second selective call network system if an acknowledgement signal is not received from said selective call receiver within said first predetermined period of time after transmission of said first interrogation signal; and transmitting said second message from said second selective call network system if an acknowledgement signal is received by said second selective call network system from said selective call receiver within a second predetermined period of time after transmission of said second interrogation signal.

11. The method of claim 2 further comprising the step of transmitting said second message from said second selective call network system in response to said forwarding step if an acknowledgement signal is not received from said selective call receiver within a second predetermined period of time after transmission of said first interrogation signal by said first selective call network system.

12. The apparatus of claim 4 wherein said first network system is a wide area network system and said second network system is an on site paging system.

13. The apparatus of claim 7 wherein said first network system is a wide area network system and said second network system is an on site paging system.

14. The method of claim 2 further comprising the step of storing said first message for later transmission by said first network system in response to said requesting and receiving step if said acknowledgement signal is not received from said selective call receiver within said first predetermined period of time after transmission of said first interrogation signal.

* * * * *